United States Patent [19]

Schmidt

[11] Patent Number: 4,607,061
[45] Date of Patent: Aug. 19, 1986

[54] BUILDING MATERIAL FOR BUILDING ELEMENTS, AND A METHOD AND A SYSTEM FOR MANUFACTURING SAID ELEMENTS

[76] Inventor: John Schmidt, Ryttergården Mogenstrup, N stved 4700, Denmark

[21] Appl. No.: 643,966
[22] PCT Filed: Dec. 21, 1983
[86] PCT No.: PCT/DK83/00126
    § 371 Date: Aug. 21, 1984
    § 102(e) Date: Aug. 21, 1984
[87] PCT Pub. No.: WO84/02489
    PCT Pub. Date: Jul. 5, 1984

[30] Foreign Application Priority Data

Dec. 22, 1982 [DK] Denmark .............................. 5685/82

[51] Int. Cl.⁴ ...................... C08G 18/14; B29C 67/16; B29C 67/22
[52] U.S. Cl. .................................... 521/122; 264/45.3; 264/46.2; 264/DIG. 7; 425/117; 425/261; 425/817 R; 521/917
[58] Field of Search .............. 264/DIG. 7, 46.2, 45.3; 425/117, 261, 817 R; 521/122, 917

[56] References Cited

U.S. PATENT DOCUMENTS

Re. 25,564  4/1964  Alford et al. ................. 264/DIG. 7
3,025,202   3/1962  Morgan et al. .................. 264/45.3
4,011,183   3/1977  Ruff ............................ 264/DIG. 7
4,072,788   2/1978  Herweg et al. ............... 264/DIG. 7

FOREIGN PATENT DOCUMENTS 2056063  7/1972  Fed. Rep. of Germany .
1329415  4/1963  France ......................... 264/DIG. 7
51-65461  6/1976  Japan ............................ 264/DIG. 7

Primary Examiner—Philip Anderson

[57] ABSTRACT

A method and apparatus or system for the continuous manufacture of building element consisting of a self-supporting framework of tightly compressed solid particles and a foaming material in the shape of a foamed plastic material, includes the use of a filling station where mold bottoms are placed in series on a roller conveyor, assembled with sidewalls and passed along a guide section, wherein particle-shaped filler is supplied from a silo while premixed foam material is injected into the material through nozzle tubes and the components are mixed before being injected into the mold and compressed. After placing of a top wall on each of the molds, these are passed under a roller conveyor, and while the molds are moved ahead between the roller conveyors and possibly roller conveyors outside the sidewalls, the foam material binds the particles together to form a monolithic unit which will set before the molds leave the roller conveyors. After demolding of the formed flow of the material, it is cut by a cutting mechanism into the required lengths and the molds are carried back to the filling station. The product is a building element of firmly compressed hard expanded burnt clay particles forming a coherent supporting skeleton of abutting particles bound together by a cured polyurethane foam in only an amount sufficient to fill the cavities between the compressed particles.

11 Claims, 5 Drawing Figures

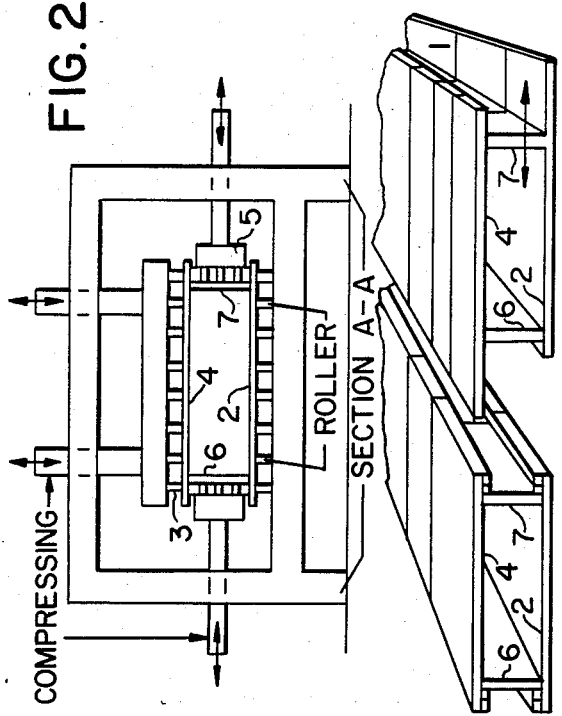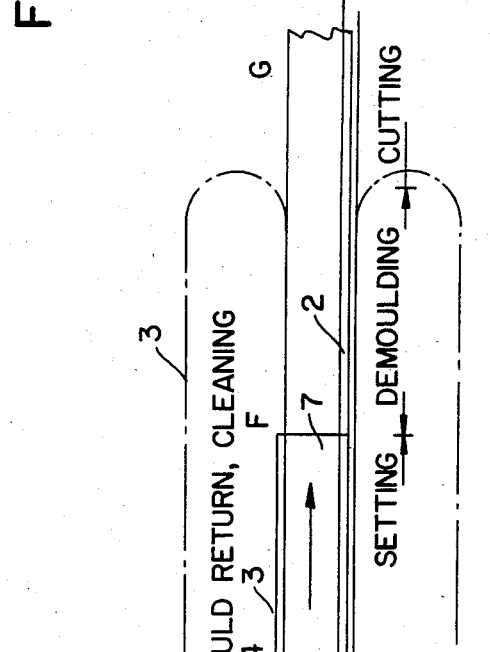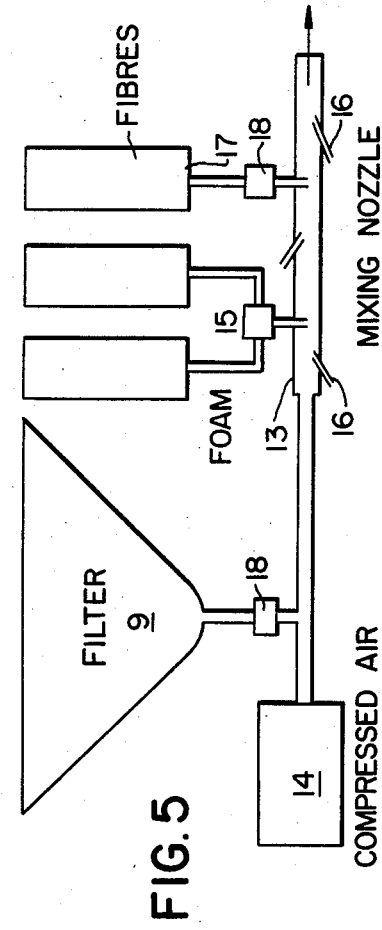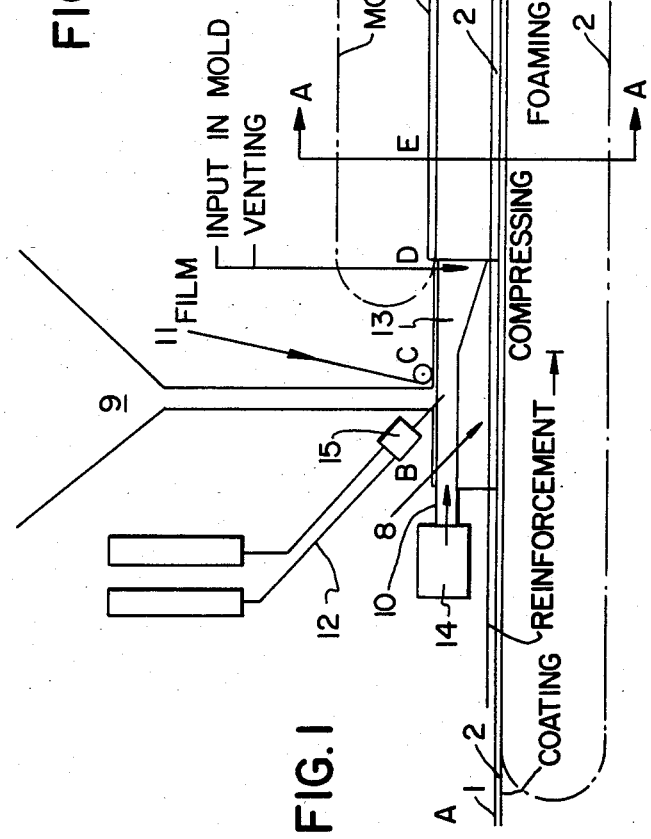

BUILDING MATERIAL FOR BUILDING ELEMENTS, AND A METHOD AND A SYSTEM FOR MANUFACTURING SAID ELEMENTS

The present invention relates to a building material for a building element in the shape of a plate, block, beam or column and consisting of a compressed, hard, particle-shaped filler, the particles of which are held together by a foam plastic material.

Lightweight building elements of foam plastic, containing as admixture and economizing means a filler in the shape of hard particles, are generally known. In manufacturing these known building materials it is attempted to achieve a distribution of the particles of maximum uniformity, and a complete embedment of each particle in a surrounding mass of foam plastic. A prior art building element of this kind may be produced, e.g. as described in the German Published Patent Specification No. 2056063, where a mixture of particles of perlite and polyurethane foam is compressed in a mould by the upper portion of the mould being pressed down into the lower portion thereof at the same time while the foaming is taking place. The compression, however, is not stronger than that the frothing agent is deposited between the particles in a way described as "a kind of mesh formation of the frothing agent in the Perlit-filling".

While the prior art building elements of the kind in question are developed with a special view to producing heat and sound insulating lightweight building elements, it is the object of the present invention to provide a cheap building material which in addition to its good insulating and fire-restraining qualities comprises such a strength as well that it can be used as a supporting element in building constructions, e.g. in such a manner that they can replace usual reinforced concrete building elements which regarding weight as well as insulating qualities are inferior to the building elements according to the invention. Furthermore, it is the object of the invention to provide a method and a system for manufacturing building elements.

The building material according to the invention is characteristic in that the particles of the filler are so firmly compressed that they form a coherent supporting skeleton or framework, and that the foam plastic material, preferably a polyurethan foam, is occurring only in a precisely sufficient amount for filling the existing natural cavities between the firmly compressed particles for cementing the particles together.

The filler is compressed so firmly in the mould that after the foaming the grains will still touch each other. This is the condition of obtaining high compression strengths.

Such a building material comprises a great number of favourable qualities, which it has not been possible to combine in any hitherto known homogenous building material. The self-supporting framework and the limitation of the foam material to the natural cavities therein cause the building material to combine a high strength and stability against contraction and shrinkage with excellent fire-restraining qualities and highly satisfactory surface qualities. In case of fire, the material is in fact self-extinguishing, and the relatively great amount of particles (e.g. 85–90% leca) and the corresponding small amount of foam plastic (e.g. 10–15% polyurethane) moreover have the effect that the problems generally occurring in connection with casting of thick elements of foam material owing to developed heat destroying the foam, are eliminated in consequence of the reduced generation of heat from the foam and the absorption by the particles of the surplus heat. The tensile strength of the material is furthermore easily improved by embedding fibres or inserting reinforcement, e.g. of aluminium. In addition to improving the tensile strength, inorganic fibres will in case of fire have a stabilizing effect, as when melting they cooperate to cement the inorganic filler together so that this will not disintegrate when the foam plastic material carbonizes. This results in a sintering of the material which acts as a heat shield preventing a further intrusion of fire. The material is easily workable, it will hold nails and can be glued. The surface which, besides, is walkproof can be given a smooth surface which is well suited to be painted. The production rate for this material, which is a few minutes, makes it particularly suited for a continuous manufacture of elements.

The building material is easily produced by a method in which foaming agents in a liquid state are amalgamated with the filler before said filler is introduced into a mould, the material thereafter being compressed in said mould, and this method is characteristic in that all components are injected into the mould through a common mixing nozzle in which loose particles of the filler and possible fibres or the like are injected with compressed air and mixed with premixed injected foam plastic material.

From the German Published Patent Specification No. 2017548 it is known to supply particles of a filler moving downwards under the influence of the force of gravity, with a foaming material by means of an annular nozzle surrounding the supply tube for the particles, but no particularly intimate mixing is obtained thereby, especially not when it is a question of such relatively small quantities of foaming material as those used for cementing the particles of the building element according to the invention together. By the injection of the particles of the suspension in an air stream and the simultaneous inflow of the premixed foaming components, however, it is possible to obtain an effective enveloping in the mixing nozzle of all particles with foam plastic, and by injecting the material into the mould under pressure, it is compressed. The method of injection with compressed air involves the advantage that the ventilation of the mould necessary for removing the pressure above the atmosphere, will remove deleterious gasses without any further exsuction being required.

Contrary to the known mixing nozzle, the nozzle according the invention owing to the stream of particles and the compressed air will be self-cleaning so that it can be started and switched off without being cleaned.

The casting of building elements may be performed in a manner known per se in common closed moulds and, further, in moulds which are open at both ends, as according to the invention the mixture of filler and premixed foam plastic material is injected from the mixing nozzle through one or more nozzle tubes placed in the direction of movement of the moulds and ending at a place in the mould, where the compression of the filler is initiated. This permits an even distribution of the material in the mould during continuous casting, whether the mould is stationary and the casting machine is moving along said mould, or vice versa the mould is moving in the longitudinal direction, e.g. on a conveyor belt or a roller conveyor. If desired, additional chemicals or admixtures, e.g. fibres of glass or polypropylene may easily be added by being injected into the mixture, thereby achieving an even addition of the fibres which are distributed homogenously in the product without flocculation.

In addition to the compression obtained by foaming of a two-component material, such as polyurethan, it is possible to provide a further security that the solid particles will form a firm coherent framework by according to the invention moving the opposed sides and-/or the top and bottom plates of the mould towards each other in a manner known per se. A corresponding method is known from the U.S. Pat. No. 3,560,599, where the object, however, is not the obtaining of a further compression of the cast material, but is the obtaining of a regular convex top side thereof. The compression may also be performed by means of one or more pistons or by vibrating elements.

The building element according to the invention or possibly several successive building elements according to the invention may be produced in a system of the kind referred to hereinafter. The injection of the mixture of particles and foaming components from the common mixing nozzle through the nozzle injection tubes extending in the longitudinal direction of the mould, ensures an even distribution of a homogeneous, continuously manufactured material which is thereafter compressed.

In the building element, reinforcement bars, tubes or corresponding bars and tubes are easily incorporated during production.

In the following the invention is explained in details in connection with an embodiment of the system according to the invention for manufacturing building elements of a compressed, self-supporting framework of filler, the cavities of which are filled with a foamed plastic material.

In the drawing

FIG. 1 is a schematic side view of the system,

FIG. 2 is a schematic cross-section through an embodiment of a mould to be used in the system, FIGS. 3 and 4 are cross-sections through two different moulds to be used in a system of the kind shown in FIG. 1, and FIG. 5 shows an injection device comprising a mixing nozzle for mixing and injecting filler particles and premixed foaming material.

The system comprises a roller conveyor 1 supporting mould bottoms 2 which are carried through the system in continuation of each other. Also, the system comprises a roller conveyor 3 having rollers pressing against the top side of the top wall 4 of the moulds, and roller conveyors 5 having rollers pressing against the opposed side walls 6, 7 of the moulds.

The mould bottoms 2 are introduced into the system at A to the left in FIG. 1 where, if desired, they can be provided with a reinforcement or a coating forming the outer side of the finished building element. At B the mould bottom passes into a firm guide section 8 which is supplied with particle-shaped filler from a silo 9 after the mould bottom 2 having been assembled with the side walls 6, 7. A foam plastic, preferably polyurethan with added foaming means, is injected through one or more nozzle tubes 12. In the guide section 8 the material is compressed by means of a piston mechanism 10 or screw conveyor—possibly during simultaneous vibration—and the top walls 4 of the moulds are placed thereon before the moulds pass under the roller conveyor 3 and between the roller conveyors 5. If desired, a sheet of film 11 may be drawn along under the top wall 4 of the mould which is open at both ends, in order that the top wall will easily release the material during the demoulding and possibly in order to form a sealing in the mould.

As indicated in FIG. 2, the side walls 6 and 7 may be adjusted in lateral direction by side roller conveyors 5 for adjustment of the width of the finished element. Moreover, the roller conveyors 5 may be so adapted that they press the side walls 6 and 7 inwards towards each other immediately after the mould having passed the mouth of the guide section 8. The foam plastic is injected into the mould under such a pressure and in such an amount that it fills the cavities between the particles and cements them together to a firm monolithic compound during the foaming and hardening of the foam plastic.

It will be understood that when producing light-weight elements it will be possible to use a stationary guide section and a moulding and calibration tube which is connected to the discharge end of said guide section and through which the flow of material will pass and from which it comes out in cured condition. In case of larger objects, such as building elements, however it is necessary to use on the section E-F, the above mentioned roller conveyors or possibly endless bands carrying mould bottoms, top walls and side walls, respectively.

On the section F-G, the flow of material is demoulded, and at G it is cut in required lengths. As indicated by arrows the mould bottoms and walls are carried back to the filling station, possibly after having been cleaned. If desired, the mould bottoms, however, may be replaced by pre-fabricated plates, such as chip boards, plates of asbestos-cement, or other plates which remain on the manufactured objects, forming a surface coating. Bars of aluminium or steel for reinforcement of supporting structures may be inserted through the guide section 8 through arbitrarily chosen holes. Electric tubes or tubes for other purposes may be inserted in the same way.

If the system is used for the manufacture of building elements having a constant width, and in cases where it is not necessary to perform an additional compression of the filler, the moulds may simply be formed as shown in cross-section in FIG. 3. FIG. 4 shows a cross-section through a mould having an adjustable width. This mould is adapted for compression of the material by pressing the side walls together under the influence of outer roller conveyors.

FIG. 5 shows schematically an apparatus for mixing and injecting the material into the moulds. The apparatus comprises a silo 9 for particle-shaped filler which is injected by means of a blower 18 into a mixing nozzle 13 which is adapted to receive as well, premixed plastic foam from a sprayer 15. From the nozzle 13 the ready mixture is injected into moulds as shown, or possibly in stationary moulds having compression devices which are known from the manufacture of concrete.

Blown-in fibres 17 or other admixtures may furthermore be supplied in the mixing nozzle 13.

Compressed-air nozzles 16 increasing the turbulent flow and promoting the mixing process may be inserted in the mixing nozzle 13. These nozzles may also be important to the cleaning of the mixing nozzle.

Dosing devices 18 of known adjustable types are situated at the places where the material is supplied.

By the method and the system according to the invention it has become possible in one single process to produce continuously in accordance with the assembly line method, monolithic reinforced building elements which are self-supporting, highly insulating and fire-restraining in consequence of the heavy compression of the cemented solid particles and of the foaming material of the self-extinguishing type cementing the particles together. Moreover, it has become possible to produce in a simple way such elements having any desired surface structure and coating.

I claim:

1. A building element comprising a body of firmly compressed hard expanded burnt clay particles forming a coherent supporting skeleton of abutting particles bound together by a cured polyurethane foam in only an amount sufficient to fill the cavities between the compressed particles.

2. A building element according to claim 1, wherein said clay particles are present in an amount of from about 85 to 90 percent, and said polyurethane foam in an amount of from about 10 to 15 percent.

3. A method of producing a building element, comprising premixing in a mixing nozzle hard expanded burnt clay particles and a foamable polyurethane binder under the influence of compressed air, discharging through a nozzle the mixture so produced while injecting the same under compressed air pressure into a mold, and compressing the mixutre sufficiently to cause said particles to contact each other during curing of said foamable polyurethane.

4. A method according to claim 3, wherein said mold is caused to move in a linear direction and said mixture is injected through a nozze disposed in the direction of movement of said mold and at a position where compression of said mixture is initiated.

5. A method according to claim 4, wherein at least two of the top, bottom and side portions of said mold are caused to move inwardly with respect to each other to compress said mixture.

6. A method according to claim 3, wherein inorganic fire resistant fibers are added to said mixture during premixing thereof, said fibers being capable of melting when exposed to fire to cement said particles together.

7. A method according to claim 3, wherein said premixing and injection of said mixture are conducted continuously and simultaneously, and said mold is moved continuously, said foamable polyurethane reacting sufficiently fast to cause curing thereof before the building element leaves the mold.

8. A method acording to claim 3, wherein the bottom of said mold is a pre-fabricated plate which is caused to adhere to the cured polyurethane and form a surface of the building element so produced.

9. A system for manufacturing a building element, comprising a mold having top, bottom and side walls adapted to compress a foamable mixture to be molded, a mixing nozzle for premixing and injecting a mixture of foaming components into said mold, means for introducing into said premixing nozzle compressed air and particulated filer material, spray means for spraying into said premixing nozzle a foamable plastic binder, and a nozzle injection tube connected to said mixing nozzle for injecting said premixed mixture into said mold.

10. A system according to claim 9, which further comprises means for blowing fibrous filler material into said premixing nozzle.

11. A system according to claim 9, wherein said nozzle injection tube is disposed at guide means for said molds, and means are provided for compressing said mixtures as it is discharged from said nozzle injection tube.

* * * * *